(12) United States Patent
Chen et al.

(10) Patent No.: US 12,729,606 B2
(45) Date of Patent: Sep. 8, 2026

(54) CAPROCK INTEGRITY FOR GEOLOGICAL $CO_2$ GEOSEQUESTRATION

(71) Applicant: SAUDI ARABIAN OIL COMPANY, Dhahran (SA)

(72) Inventors: Hsieh Chen, Cambridge, MA (US); Shitong Sherry Zhu, Waban, MA (US)

(73) Assignee: SAUDI ARABIAN OIL COMPANY, Dhahran (SA)

(*) Notice: Subject to any disclaimer, the term of this patent is extended or adjusted under 35 U.S.C. 154(b) by 136 days.

(21) Appl. No.: 18/497,682

(22) Filed: Oct. 30, 2023

(65) Prior Publication Data

US 2025/0137357 A1 May 1, 2025

(51) Int. Cl.
*E21B 41/00* (2006.01)
*C09K 8/575* (2006.01)

(52) U.S. Cl.
CPC .......... *E21B 41/0064* (2013.01); *C09K 8/575* (2013.01)

(58) Field of Classification Search
CPC .... F02C 1/10; F02C 1/005; F02C 1/05; F02C 6/14; F24T 10/20; F24T 2010/53; Y02E 10/10; Y02E 20/14; Y02E 50/10; F01K 13/00; F05D 2260/611; F05D 2210/12; E21B 41/0064; Y02C 20/40; C09K 8/575; C09K 8/506
See application file for complete search history.

(56) References Cited

U.S. PATENT DOCUMENTS 3,135,326 A * 6/1964 Santee .................... C09K 8/58 166/270.1
4,867,238 A * 9/1989 Bayless .................. C09K 8/845 166/272.6
5,548,025 A 8/1996 Bening
8,779,079 B2 7/2014 Henning et al.
9,084,960 B2 7/2015 Lahary et al.
9,834,381 B2 12/2017 Wang et al.
10,087,278 B2 10/2018 Lobert et al.
11,413,600 B2 8/2022 Onaizi et al.
2007/0045268 A1* 3/2007 Vinegar .................. E21B 43/24 219/207

(Continued)

FOREIGN PATENT DOCUMENTS

CN 116658137 A 8/2023

OTHER PUBLICATIONS

ISR-WO dated Feb. 17, 2025 for PCT/US2024/053252 which claims priority to this US application.

(Continued)

*Primary Examiner* — Edwin J Toledo-Duran
(74) *Attorney, Agent, or Firm* — Vorys, Sater, Seymour and Pease LLP

(57) ABSTRACT

Methods and systems for reinforcing caprock and enhancing caprock integrity for $CO_2$ geosequestration. The methods and systems include a reaction between precursor chemicals and $CO_2$ to form mineralization and/or gelation that reinforces the caprock and prevents leakage of geosequestered $CO_2$. The precursor chemicals include bifunctional molecules comprising a first functional group for binding to a mineral surface of the caprock and a second functional group for reacting with the $CO_2$.

17 Claims, 10 Drawing Sheets

(56) References Cited

U.S. PATENT DOCUMENTS

2008/0006410 A1* 1/2008 Looney .................. C09K 8/594
166/308.4
2009/0202304 A1* 8/2009 Koide ................ B01D 53/1475
405/129.2
2010/0012331 A1* 1/2010 Larter ................... E21B 43/243
166/401
2010/0326924 A1* 12/2010 Georgiou ............ E21B 41/0064
210/768
2011/0186295 A1* 8/2011 Kaminsky ........... E21B 43/2401
166/302
2012/0001429 A1* 1/2012 Saar ...................... F01K 25/103
290/52
2012/0109611 A1* 5/2012 Loizzo ................ E21B 41/0064
703/10
2013/0036748 A1* 2/2013 Lewis ................... E21B 43/164
60/39.52
2013/0043678 A1* 2/2013 Saar .......................... F02C 1/10
165/45
2013/0064604 A1 3/2013 Han
2014/0054039 A1* 2/2014 Chang .................... C09K 8/885
166/292
2014/0311740 A1* 10/2014 Patil ........................ E21B 43/25
166/276
2017/0081604 A1* 3/2017 Matton ................... C10L 3/104
2018/0016392 A1 1/2018 Lobert et al.
2018/0171768 A1* 6/2018 Tiffany, III ............... C02F 9/00
2018/0244977 A1* 8/2018 Cortez .................. E21B 21/003
2019/0062059 A1* 2/2019 Kwon ...................... C07K 7/06
2020/0284945 A1 9/2020 Khan
2023/0087878 A1* 3/2023 Stewart .............. B01D 53/1493
405/129.35
2024/0018849 A1* 1/2024 Patel ................... E21B 41/0064
2024/0093576 A1* 3/2024 Al-Qasim ............... C04B 28/24
2024/0376871 A1* 11/2024 Calassou ................. F03G 4/069
2025/0084746 A1* 3/2025 Patel ..................... E21B 43/295
2025/0122780 A1* 4/2025 Shors .................. E21B 41/0064

OTHER PUBLICATIONS

Shukla, Richa, et al. “A review of studies on CO2 sequestration and caprock integrity.” Fuel 89.10 (2010): 2651-2664.
Yamada, Hidetaka. “Amine-based capture of CO2 for utilization and storage.” Polymer Journal 53.1 (2021): 93-102.
Shen, Xinhua, et al. “Polyethylenimine applications in carbon dioxide capture and separation: from theoretical study to experimental work.” Energy Technology 5.6 (2017): 822-833.
Annabi, Nasim, et al. “The fabrication of elastin-based hydrogels using high pressure CO2.” Biomaterials 30.1 (2009): 1-7.
Sharma, Pragati, et al. “Molecular view of CO2 capture by polyethylenimine: role of structural and dynamical heterogeneity.” Langmuir 34.17 (2018): 5138-5148.
Merdas, I., F. Thominette, and J. Verdu. “Hydrolytic ageing of polyamide 11—effect of carbon dioxide on polyamide 11 hydrolysis.” Polymer Degradation and Stability 79.3 (2003): 419-425.
Peng, Cheng, et al. “The pH of CO2-saturated water at temperatures between 308 K and 423 K at pressures up to 15 MPa.” The Journal of Supercritical Fluids 82 (2013): 129-137.

* cited by examiner

FIG. 7
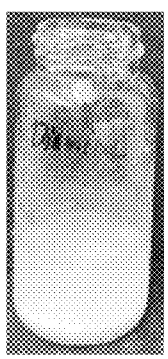
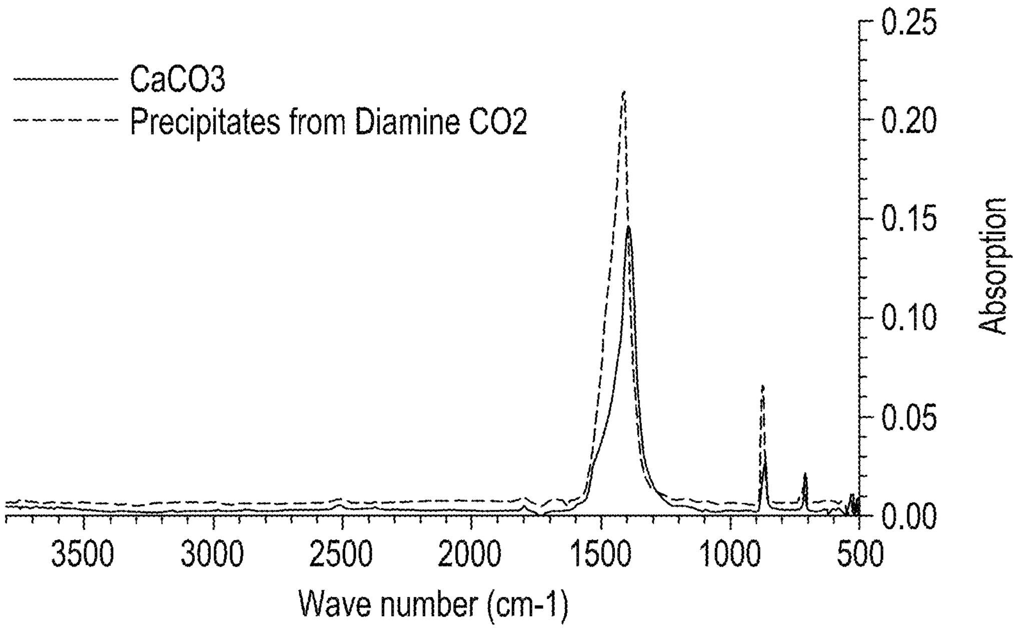
FIG. 8
FIG. 9
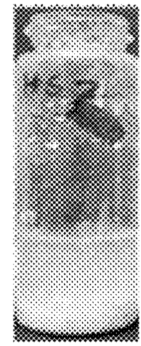

CAPROCK INTEGRITY FOR GEOLOGICAL $CO_2$ GEOSEQUESTRATION

FIELD OF INVENTION

The present disclosure relates generally to methods and systems for use in the oil and gas industry, and more particularly, to methods and systems for enhancing caprock integrity for $CO_2$ geosequestration.

BACKGROUND

Long-term geological sequestration (geosequestration) and storage of $CO_2$ gas in subterranean formation reservoirs (e.g., saline aquifers and/or depleted oil and gas wells) offers the possibility of sustaining access to fossil fuels while reducing gaseous emissions that contribute to global warming and climate change. However, prior to implementation, associated risks of gaseous leakage into the atmosphere must be carefully managed to ensure environmental safety. In formation reservoirs, where gases are injected for geosequestration and storage, caprock integrity is thus a critical consideration, but also a complex geo-mechanical issue. As used herein, the term "caprock," and grammatical variants thereof, refers to a layer of hard, generally (preferably) less permeable rock overlying and sealing a deposit of a gas (although other fluids can also be sealed thereunder).

A number of factors can influence caprock integrity including, but not limited to, the thickness of the caprock, the permeability of the caprock, the heterogeneity of the caprock, and the geological activity beneath the caprock. If caprock is too thin, it may be unable to withstand gas injection pressure leading to fractures for $CO_2$ migration into the atmosphere and potentially total failure. The permeability of caprock is critical to preventing gaseous emissions; low permeability caprocks are thus preferred for $CO_2$ geosequestration. Relatively highly heterogeneous caprocks can indicate the presence of fractures for $CO_2$ migration into the atmosphere and potential for total failure. Finally, geological activity, such as seismic events or subsistence, can pose risks to caprock integrity related to caprock damage and stress/pressure state changes that increase the threat of gaseous emissions from a reservoir.

Currently, $CO_2$ mineralization (e.g., into $MgCO_3$ or $CaCO_3$) is considered the safest geosequestration method because it solidifies the gas, thus preventing any leakage. However, the total amount of $CO_2$ that can be mineralized is limited by the availability and accessibility of divalent ions (e.g., $Mg^{2+}$ or $Ca^{2+}$) within geosequestration reservoirs.

Another dominant $CO_2$ geosequestration technology includes absorption, or carbon scrubbing, using amines as Lewis bases, such as liquid amines or solid polymeric amines, that bind $CO_2$ to form carbamates, carbamic acid, or bicarbonates. Furthermore, when the $CO_2$ is dissolved in a brine (e.g., seawater comprising various ions), reaction with amines can result in mineralization and/or gelation. However, corrosion, degradation, high cost, and scalability limit large-scale applications of liquid or solid amine-based $CO_2$ geosequestration technology.

For both the current mineralization technology and the current amine-based technology for geosequestration, only a single $CO_2$ molecule can react with a single ion or amine functional group, respectively. Accordingly, a rather vast amount of ions or amines is necessary to effectuate these technologies, which is not feasible for large-scale $CO_2$ geosequestration.

In light of the aforementioned issues with current $CO_2$ geosequestration technologies, the present disclosure provides an alternative $CO_2$ geosequestration technology aimed at achieving caprock integrity of saline aquifer caprocks.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In one or more aspects, the present disclosure provides a method including providing an injection well into which fluids are injected into a saline aquifer, the saline aquifer located below a caprock and an interface located between the saline aquifer and the caprock; injecting a plurality of precursor chemicals through the injection well and into the saline aquifer; depositing the precursor chemicals at or near the interface; injecting $CO_2$ through the injection well and into the saline aquifer; contacting the $CO_2$ with the precursor chemicals; and reacting the $CO_2$ and the precursor chemicals to reinforce the caprock by one or both of mineralization or gelation, thereby forming reinforced caprock.

In another aspect, the present disclosure provides a method including providing an injection well into which fluids are injected into a saline aquifer having a geosequestered CO2 plume therein, the saline aquifer located below a caprock and an interface located between the saline aquifer and the caprock, and wherein the caprock comprises at least one leakage pathway; injecting a plurality of precursor chemicals through the injection well and into the saline aquifer; depositing the precursor chemicals at or near the interface; contacting the precursor chemicals with the geosequestered $CO_2$; and reacting the $CO_2$ and the precursor chemicals to reinforce the caprock by one or both of mineralization or gelation, thereby forming reinforced caprock and preventing leakage of $CO_2$ from the geosequestered CO2 plume through the at least one leakage pathway.

In another aspect, the present disclosure provides a system including an injection well for accessing a saline aquifer; a reinforced caprock located above the saline aquifer, wherein the reinforced caprock is comprised of one or both of mineralization or gelation by a reaction between a plurality of precursor chemicals and $CO_2$; and a geosequestered CO2 plume in the saline aquifer beneath the reinforced caprock.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 7 is a photograph of solid precipitate mineralization and/or gelation of a diamine precursor chemical after heating in the pressure vessel at 150° C. for 3 days in the presence of $CO_2$ according to Example 1, according to one or more aspects of the present disclosure.

FIG. 8 provides an FTIR spectra of the solid precipitates according to Example 1, according to one or more aspects of the present disclosure.

FIG. 9 is a photograph of solid precipitate mineralization and/or gelation of a waste plastic precursor chemical after heating in the pressure vessel at 150° C. for 3 days in the presence of $CO_2$ according to Example 2, according to one or more aspects of the present disclosure.

DETAILED DESCRIPTION

Figure 1:
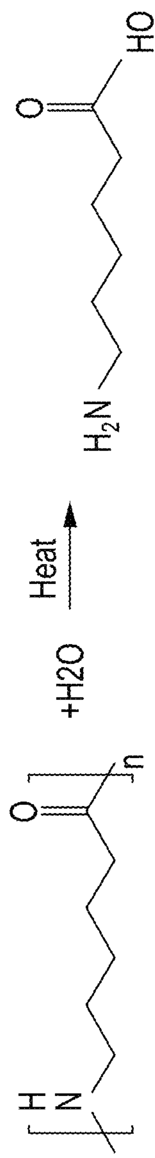
FIG. 1 provides a chemical reaction scheme of polyamides under high temperature.

Embodiments in accordance with the present disclosure generally relate to methods and systems for use in the oil and gas industry, and more particularly, to methods and systems for enhancing caprock integrity for $CO_2$ geosequestration.

Embodiments of the present disclosure will be described, in some instances herein, in detail with reference to the accompanying chemical structures and Figures. In the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

As discussed above, there is interest in introduction of $CO_2$ to a subterranean formation reservoir for geosequestration and storage. The present disclosure provides methods and systems for enhancing caprock integrity of saline aquifers by reinforcement utilizing a partial $CO_2$ reaction and subsequent mineralization and/or gelation of the $CO_2$ to reduce or prevent leakage of $CO_2$ into the atmosphere. The term "mineralization," and grammatical variants thereof, refers to the conversion of $CO_2$ or the reaction of precursor chemicals and $CO_2$ into solid precipitates, such as in the form of mineral scale, mineral nanofibers, mineral crystals, or other mineral solids, and any combination thereof. As used herein, the term "gelation," and grammatical variants thereof, refers to the association or crosslinking of precursor chemicals, multivalent cations, and $CO_2$ into a continuous network forming a rigid structure that is resistant to flow, including under pressure.

The reinforced caprock of the present disclosure advantageously may allow safe $CO_2$ geosequestration in saline aquifers that were otherwise considered incapable or too risky for such geosequestration, thereby increasing the available space for safe $CO_2$ geosequestration. Moreover, advantageously the methods and systems of $CO_2$ geosequestration described herein are cost-effective, utilizing less costly mineralization and gelation resources compared to current mineralization and amine-based $CO_2$ geosequestration technologies, described above, while maximizing safe and long-term $CO_2$ geosequestration capacity in saline aquifers.

More specifically, the $CO_2$ geosequestration technology of the present disclosure utilizes precursor chemical(s) injection at interface regions near the caprock of a saline aquifer, followed by $CO_2$ injection. Generally, the interface regions "near" the caprock are within about 1 millimeter (mm) to about 2 meters (m), encompassing any value and subset therebetween. The $CO_2$ geosequestration technology of the present disclosure further utilizes precursor chemical(s) injection at the interface regions near the caprock of a saline aquifer for remedying leakage pathways in existing $CO_2$ geosequestered reservoirs. As used herein, the term "interface," and grammatical variants thereof, refers to the location at or near the surface between the caprock and the saline aquifer. The precursor chemicals may further migrate into leakage pathways within the caprock (e.g., fractures and/or faults), as described in greater detail below. The precursor chemical(s) are bifunctional molecules that adhere to the saline aquifer caprock and react with the $CO_2$ in the presence of divalent ions, resulting in $CO_2$ mineralization and/or gelation to prevent leakage.

Saline aquifers are generally characterized by great depths that make them often technically and economically unfeasible for exploitation for surface uses, but can otherwise be exploited for $CO_2$ geosequestration. It is to be appreciated that while the present disclosure is described with reference to $CO_2$ geosequestration in saline aquifers, other subterranean formations suitable for gaseous geosequestration, such as depleted oil and gas wells, are equally applicable to the methods and systems described herein. Depleted oil and gas wells have previously been drilled into a subterranean formation and can no longer be used for hydrocarbon recovery. Accordingly, advantageously, the methods and systems described herein can be used in subterranean formation reservoirs that are either readily available (e.g., saline aquifers) or afford utilization of the large capital expenditures borne during prior hydrocarbon drilling.

Precursor Chemicals

As described above, the precursor chemicals for use in reinforcement of caprock are bifunctional molecules. These bifunctional molecules react with $CO_2$ in the presence of divalent ions (e.g., $Mg^{2+}$ and/or $Ca^{2+}$) to form mineralization and/or gelation on saline aquifer caprocks.

The precursor chemicals include one functional group that binds to the mineral surface of a caprock and a second functional group that reacts with $CO_2$ upon the presentation of divalent ions. The divalent ions may be naturally present within a saline reservoir or otherwise presented by injection, including injection with the $CO_2$ (e.g., with liquid $CO_2$).

Examples of precursor chemicals for use in the present disclosure include, but are not limited to, molecules comprising alkoxysilane group(s) for binding to the mineral surface of a caprock and organofunctional group(s) of amines or acids for reacting with $CO_2$ for mineralization and/or gelation thereof.

Examples of specific precursor chemicals include, but are not limited to, bis(3-(trimethoxysilyl)propyl)amine; 3-aminopropyltriethoxysilane; N-[3-(trimethoxysilyl)propyl]ethylenediamine; N-[3-(triethoxysilyl)propyl]diethylenetriamine; N-(trimethoxysilylpropyl)ethylenediaminetriacetate; 3-(1,3-dimethylbutylidene)aminopropyltriethoxysilane; n-(2-aminomethyl)-2,2,4-trimethyl-1-aza-2-silacyclopentane; n-(2-aminoethyl)-2,2,4-trimethyl-1-aza-2-silacyclopentane; 1-ethyl-2,2-dimethoxy-4-methyl-1-aza-2-silacyclopentane; 1,6-hexanediamine; and any combination thereof. The chemical structures of each of these specific precursor chemicals is provided by Structures 1-10 below:

Structure 1

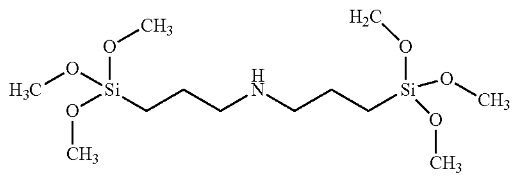

bis(3-(trimethoxysilyl)propyl)amine

Structure 2

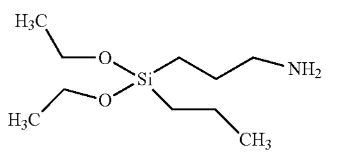

3-aminopropyltriethoxysilane

Structure 3

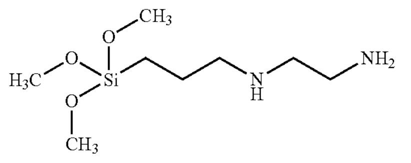

N-[3-(trimethoxysilyl)propyl]ethylenediamine

Structure 4

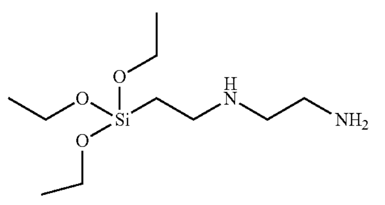

N-[3-(triethoxysilyl)propyl]diethylenetriamine

-continued

Structure 5

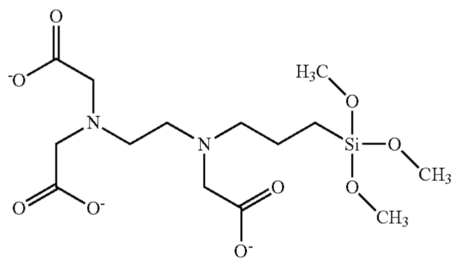

N-(trimethoxysilylpropyl)ethylenediaminetriacetate

Structure 6

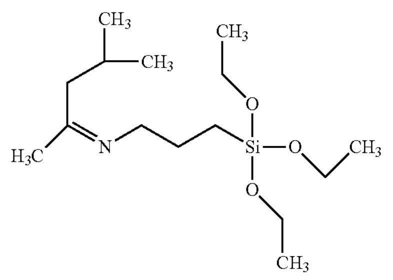

3-(1,3-dimethylbutylidene)aminopropyltriethoxysilane

Structure 7

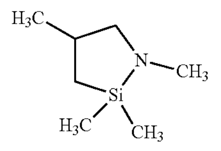

n-(2-aminomethyl)-2,2,4-trimethyl-1-aza-2-silacyclopentane

Structure 8

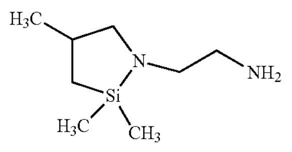

n-(2-aminoethyl)-2,2,4-trimethyl-1-aza-2-silacyclopentane

Structure 9

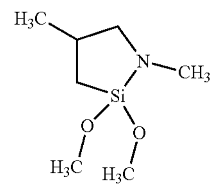

1-ethyl-2,2-dimethoxy-4-methyl-1-aza-2-silacyclopentane

Structure 10

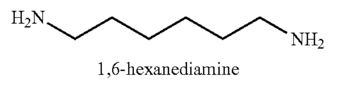

1,6-hexanediamine

In one or more embodiments, which may be combined with any and all of the precursor chemicals described herein (e.g., those described above), sources of the precursor chemicals may be obtained from hydrolyzing waste plastics in saline aquifers. The waste plastic is hydrolyzed by contact with an aqueous fluid in the saline aquifer. The waste plastic contains a nitrogen element as a functional group for reaction with $CO_2$ injected in a saline aquifer to mineralize and/or gel the $CO_2$ after the waste plastic has been hydrolyzed.

Examples of waste plastics for use in $CO_2$ geosequestration of the present disclosure include, but are not limited to, polyamides (nylon), polyaramids, polyimides, and any combination thereof. The following description of the use of waste products is provided with reference to polyamides; however, it is to be appreciated that the functionality of hydrolysis and $CO_2$ reaction to mineralize and/or gel the $CO_2$ is equally applicable to polyaramids and polyimides, without limitation and without deviating from the scope of the present disclosure.

Polyamides, for example are widely used polymers in various industries, such as the automotive and electronic industries, and therefore associated waste polyamides are widely available. Polyamide degradation kinetics is temperature and pH dependent, where higher temperatures and lower pHs resulting in faster degradation. Polyamide bonds can be hydrolyzed at high temperatures to obtain amines and acids, as shown in FIG. 1.

In more detail, the degradation product of polyamides includes amines and carboxylic acid. Accordingly, and without being bound by theory, it is believed that polyamide waste products can provide a low-cost source of precursors for reaction with $CO_2$ for $CO_2$ mineralization and/or gelation. Indeed, the high temperature, high humidity, and aqueous (water-based) environment in saline aquifers can provide the energy (heat) and aqueous environment for the hydrolytic degradation of polyamides. $CO_2$ is an acid gas and when dissolved in the aqueous environment of a saline aquifer will lower the pH of the aqueous fluid. The $CO_2$ may lower the aqueous fluid in the range of about 3 to about 4.2, encompassing any value and subset therebetween, such as about 3 to about 3.2, or about 3.2 to about 3.4, or about 3.4 to about 3.6, or about 3.6 to about 3.8, or about 3.8 to about 4.0, or about 4.0 to about 4.2, depending on pressure and temperature. Accordingly, the $CO_2$ injected into a saline aquifer for geosequestration can provide an acid aqueous environment that facilitates the degradation of polyamides. Moreover, the $CO_2$ and the presence of divalent cations in the aqueous environment of the saline aquifer, or otherwise provided by surface injection, react with the degradation products of the polyamides to form $CO_2$ mineralization and/or gelation.

Figure 2A:
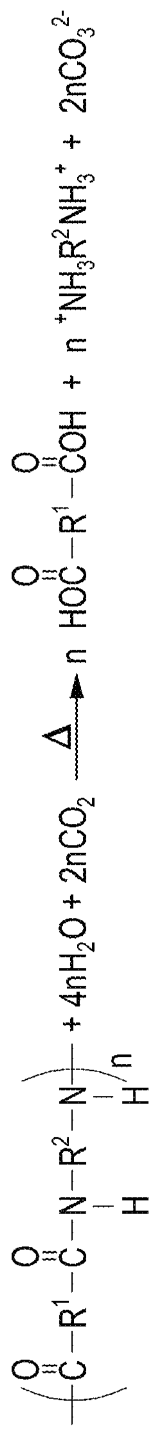
FIG. 2A provides a chemical reaction scheme of polyamides in a saline aquifer comprising injected $CO_2$ to produce degradation byproducts.
Figure 2B:
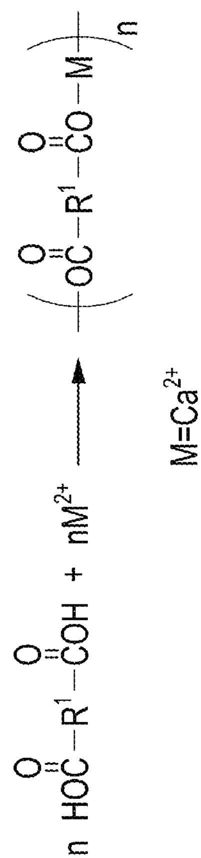
FIG. 2B provides a chemical reaction scheme of the byproducts of FIG. 2A in the presence of divalent ions in the saline aquifer for reinforcing caprock.

The chemical reaction scheme shown in FIG. 2*a* illustrates the degradation of polyamide (e.g., polyamide 6,6 (PA66)) to form diacids and alkyl di-ammonia. FIG. 2*b* provides the chemical reaction scheme illustrating the degradation products from FIG. 2*a* in the presence of divalent ions ($Ca^{2+}$ shown, but the reaction is not limited to $Ca^{2+}$) to form 1) adipic acid that reacts with divalent cation to form inorganic polymers as gelation and 2) diamine that promotes $CO_2$ mineralization for reinforcing caprock in saline aquifers for $CO_2$ geosequestration.

The amount of precursor chemicals used in a particular $CO_2$ geosequestration application in a saline aquifer reservoir (or depleted oil and gas reservoir) may depend on a number of factors including, but not limited to, the temperature of the reservoir, the pressure of the reservoir, the pH of the reservoir, the surface area of the cap rock, the desired form of mineralization and/or gelation, and the like, and any combination thereof. In some embodiments, the amount of precursor chemicals introduced into a reservoir for $CO_2$ geosequestration is in the range of about 1 wt % to about 30 wt %, encompassing any value and subset therebetween, such as in the range of about 1 wt % to about 3 wt %, or about 3 wt % to about 6 wt %, or about 6 wt % to about 9 wt %, or about 9 wt % to about 12 wt %, or about 12 wt % to about 15 wt %, or about 15 wt % to about 18 wt %, or about 18 wt % to about 21 wt %, or about 21 wt % to about 24 wt %, or about 24 wt % to about 27 wt %, or about 27 wt % to about 30 wt %, or about 7 wt % to about 23 wt %, or about 10 wt % to about 20 wt %.

Methods and Systems for Reinforcing Caprock

The present disclosure further provides methods and systems for delivery of the precursor chemicals and $CO_2$ into a saline aquifer.

Before describing the specific methods and systems of the present disclosure, an embodiment of an injection well system configured for delivering the precursor chemicals and $CO_2$ of the present disclosure (collectively "injection fluids") to a saline aquifer location for $CO_2$ geosequestration is presented. The term "injection well," and grammatical variants thereof, refers to a well used for emplacement of fluids underground, including for storage thereat.

Figure 3:
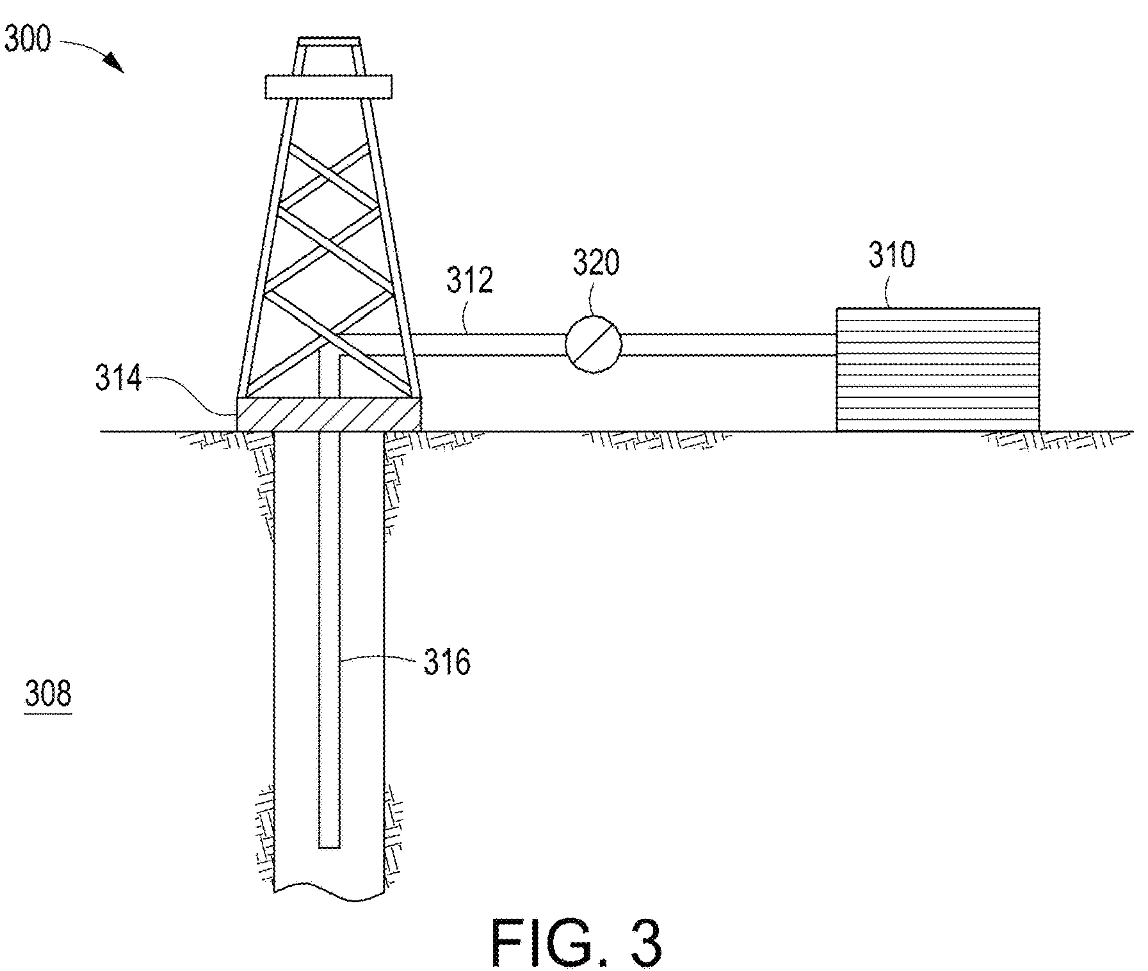
FIG. 3 illustrates an embodiment of an injection well system configured for delivering the injection well fluids to a saline aquifer location for $CO_2$ geosequestration, according to one or more aspects of the present disclosure.

FIG. 3 shows an illustrative schematic of a system that can deliver injection fluids of the embodiments disclosed herein to a saline aquifer reservoir (and caprock there atop) for $CO_2$ geosequestration, according to one or more embodiments. It should be noted that while FIG. 3 generally depicts a land-based system, it is to be recognized that like systems may be operated in subsea locations as well. As depicted in FIG. 3, system 300 may include a fluid storage tank 310, in which an injection fluid of the embodiments disclosed herein may be stored or otherwise formulated. The injection fluid may be conveyed via line 312 to wellhead 314, where the injection fluid enters tubular 316, tubular 316 extending from wellhead 314 into subterranean formation 308 comprising a saline aquifer (and caprock there atop). Upon being ejected from tubular 316, the injection fluid may subsequently penetrate into subterranean formation 308. Pump 320 may be configured to raise the pressure of the injection fluid to a desired degree before its introduction into tubular 316. It is to be recognized that system 300 is merely exemplary in nature and various additional components may be present that have not necessarily been depicted in FIG. 3 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Figure 4:
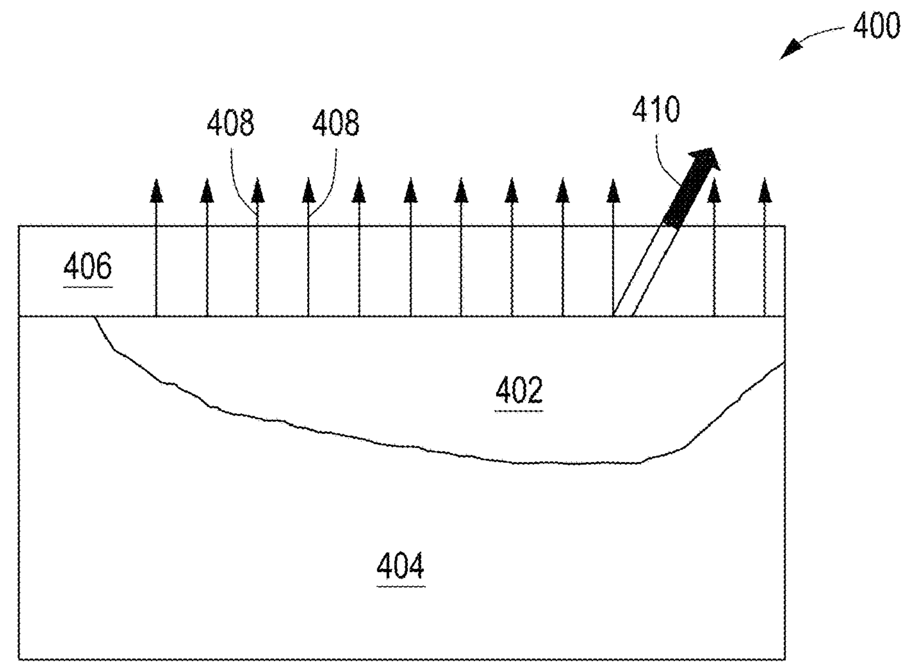
FIG. 4 illustrates a schematic drawing of gaseous $CO_2$ leakage pathways in caprock of a saline aquifer.

Referring first to FIG. 4, illustrated is a schematic drawing of gaseous $CO_2$ leakage pathways in caprock of a saline aquifer. As shown, a saline aquifer 404 comprises a gaseous plume 402 below caprock 406. Gaseous $CO_2$ leakage may potentially include area leakage 408 (the vertical arrows) or leakage through fractures and faults 410. The area leakage 408 and fracture/fault leakage 410 may provide pathways for gaseous escape through the caprock 406 due to, for example, pore pressure increase owing to the gaseous plume 402 injected into the saline aquifer 404 below the caprock 406. Area leakage 408 occurs when the stored gaseous plume 402 imbibes into the caprock 406 due to pore pressure. The existence of fracture/fault leakage 410 occurs due to an existing fracture/fault (e.g., natural or due to drilling subterranean formation wells) or due to shifts in the caprock 406 after the gaseous plume 402 has been injected. Both types of leakage can lead to significant gaseous $CO_2$ escape into the atmosphere.

Figure 5A:
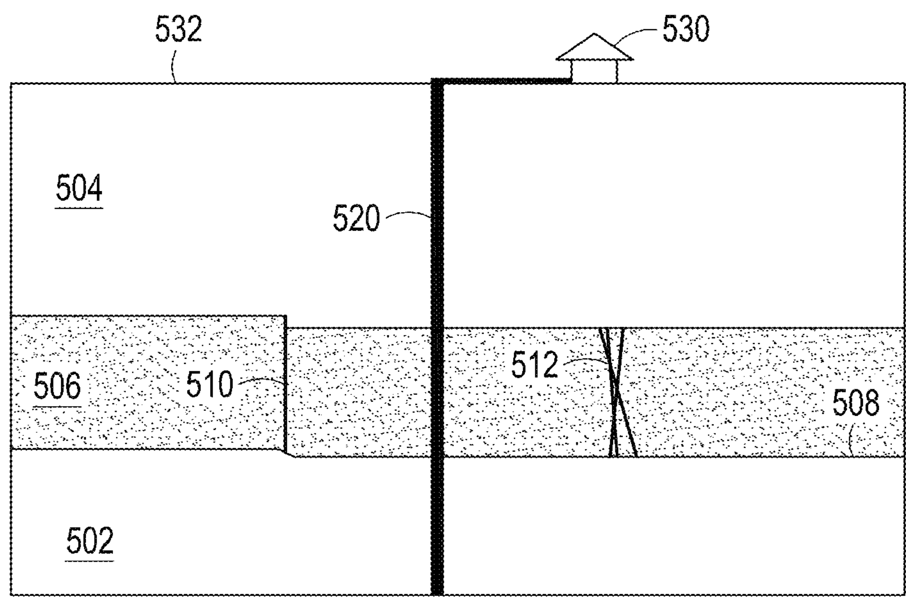
FIGS. 5A-5C illustrate a method for reinforcing caprock using precursor chemicals, according to one or more aspects of the present disclosure.
Figure 5B:
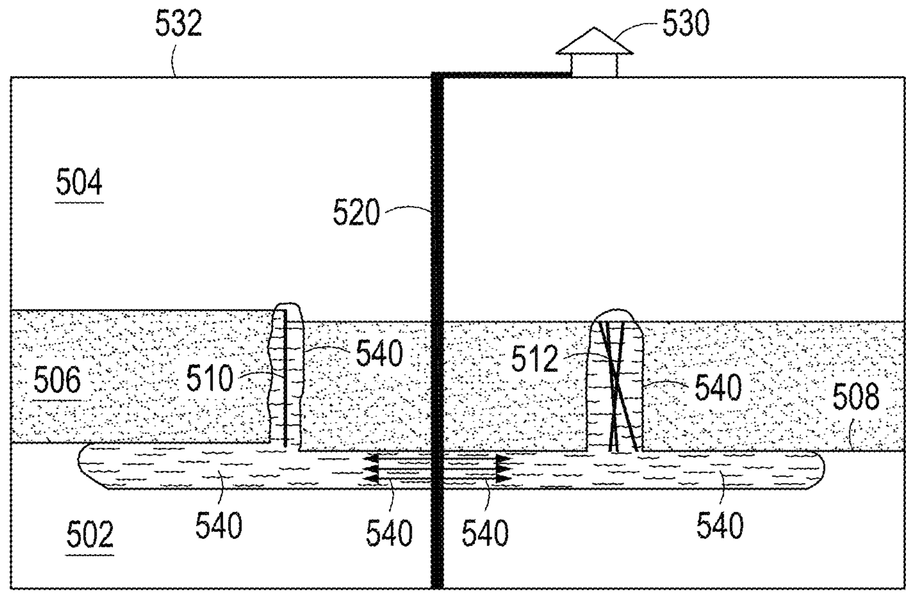
Figure 5C:
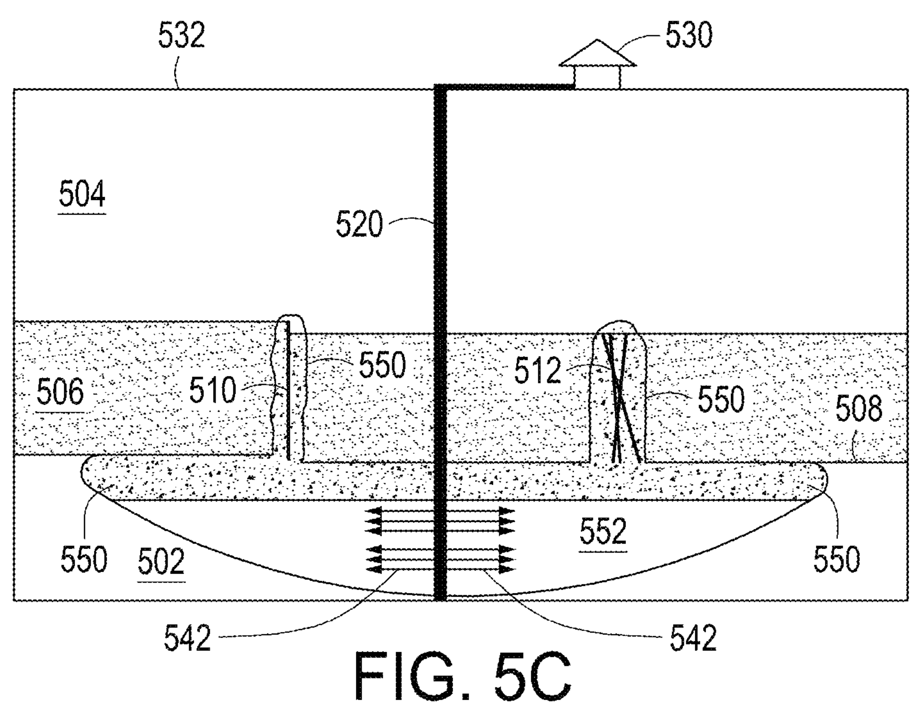

Referring now to FIGS. 5A-5C, illustrated is a methodology and system for reinforcing (increasing the integrity) of caprock using precursor chemicals, according to one or more aspects of the present disclosure. Like numerical references will be used for like elements in FIGS. 5A-5C. As shown in each of FIGS. 5A-5C, a saline aquifer 502 is identified for $CO_2$ geosequestration. The saline aquifer 502 is located below the subsurface 504, and atop the saline aquifer 502 is a layer of caprock 506. An interface 508 exists between the caprock 506 and the saline aquifer 502. The caprock 506, as shown, comprises a number of potential leakage pathways, namely a fault 510 and fractures 512. It is to be appreciated that the caprock 506 need not have any leakage pathways, may have one or more of only fault potential leakage pathways, may have one or more of only fracture potential leakage pathways, or may have a plurality of both fault and fracture potential leakage pathways, without departing from the scope of the present disclosure.

An injection well 520 extends through the subsurface 504, through the caprock 506, and into (or through) the saline aquifer 502 for $CO_2$ geosequestration. The injection well 520 extends from a wellhead 530 (see FIG. 3 and associated elements) located at the surface 532.

As shown in FIG. 5A, the injection well 520 is drilled and extends from a wellhead 530 upon identification of the saline aquifer 502 as a desirable location for $CO_2$ geosequestration. Alternatively, the injection well 520 may have previously been drilled.

As shown in FIG. 5B, precursor chemicals 540 (arrows) are injected through the injection well 520 and into the saline aquifer 502 at or near the interface 508 between the caprock 506 and the saline aquifer 502. Accordingly, the precursor chemicals 540 are deposited at or near the interface 508 between the caprock 506 and the saline aquifer 502, covering a large portion or all of the interface 508, and further penetrate upward through the caprock 506 into leakage pathway fault 510 and fractures 512, when present. The precursor chemicals 540 may further penetrate upward through intestinal spaces (due to porosity) (not shown) in mineral components of the caprock 506.

Referring now to FIG. 5C, after injection of the precursor chemicals 540 (FIG. 5B), $CO_2$ 542 (arrows) is injected through the injection well 520 to the saline aquifer 502, generally in liquid form. The $CO_2$ 542 migrates upward to the interface 508 and contacts the precursor chemicals 540 (FIG. 5B) and flows therethrough, including up through the precursor chemicals into leakage pathways, such as the fault 510 and fractures 512. Reaction between the precursor chemicals 540 (FIG. 5B) and the $CO_2$ 542 results in the formation of mineralization and/or gelation 550 of the precursor chemicals 540 (FIG. 5B). The mineralization and/or gelation 550 reinforces (increases the integrity of) the caprock 506, thereby preventing emission of the $CO_2$ 542 through leakage pathways, such as fault 510 and fractures 512, or any other porous portions of the caprock 506 (not shown). Accordingly, the $CO_2$ 542 (and any additional $CO_2$ injected through the injection well 520) can be effectively geosequestered, forming a CO2 plumee 552 beneath the caprock 506.

Accordingly, in one or more embodiments, the present disclosure provides a method comprising identifying a saline aquifer (or depleted oil and gas well) having caprock suitable for $CO_2$ geosequestration. The caprock may or may not have potential leakage pathways, such as faults and/or fractures. An existing injection well may penetrate through the caprock and into the saline aquifer, such as an existing hydrocarbon-producing or water-producing well that can operate as an injection well. Alternatively, an injection well is drilled through the caprock and penetrates the saline aquifer.

First, a plurality of precursor chemicals is injected into the injection well (through the wellhead) to the saline aquifer and is deposited at or near the interface between the caprock and the saline aquifer. The precursor chemicals further penetrate upward through the caprock (upward past the interface) into any leakage pathways, such as faults and/or fractures. Thereafter, $CO_2$ is injected into the injection well, migrates upward to the interface, and contacts the precursor chemicals, including those within any leakage pathways comprising the precursor chemicals. The $CO_2$ reacts with the precursor chemicals, resulting in mineralization and/or gelation, thereby reinforcing the caprock. Accordingly, $CO_2$ injected into the saline aquifer is able to be effectively geosequestered beneath the reinforced caprock (e.g., a CO2 plume) without leakage.

Figure 6A:
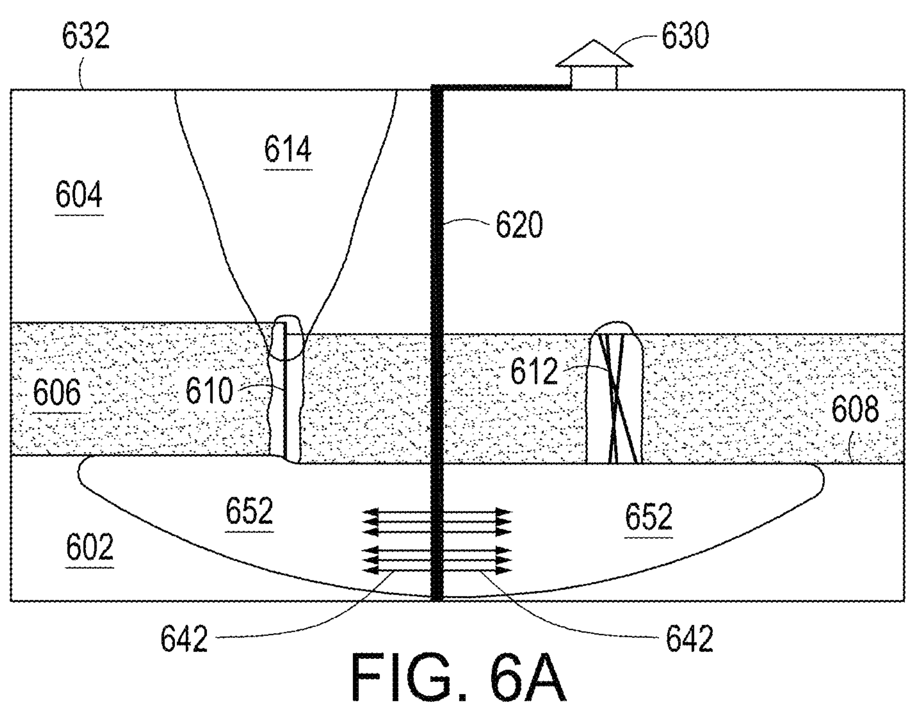
FIGS. 6A-6C illustrate a method for reinforcing caprock using precursor chemicals, according to one or more aspects of the present disclosure.
Figure 6B:
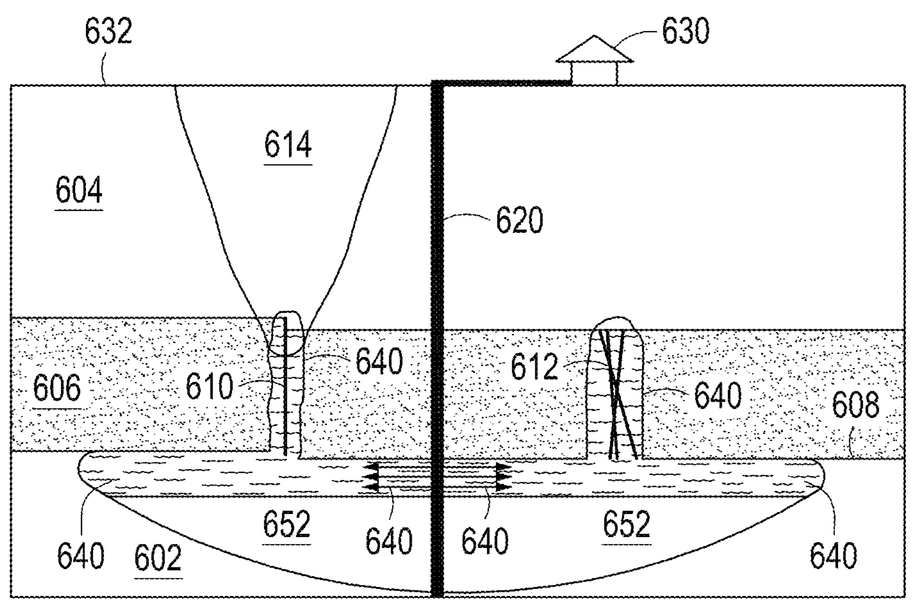
Figure 6C:
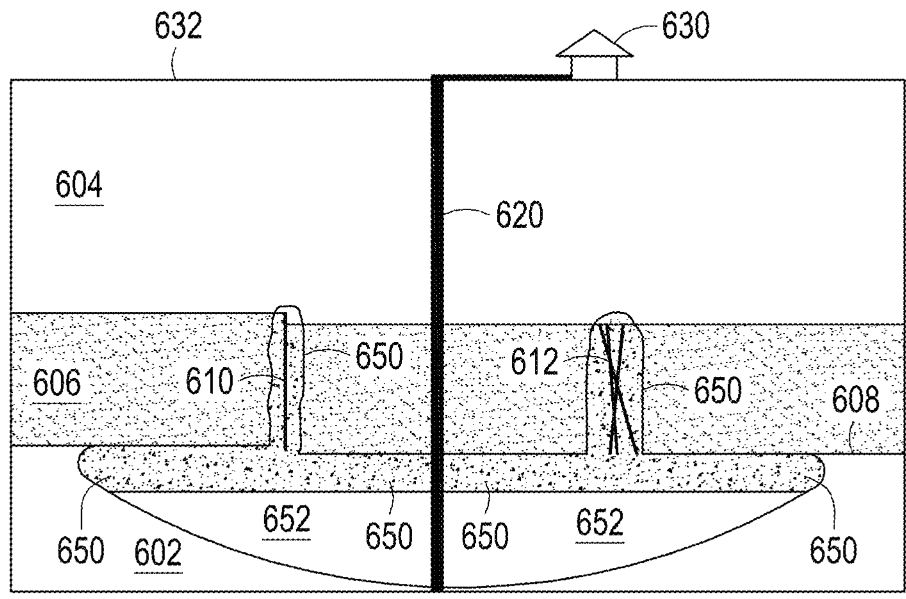
Figures 10A, 10B:
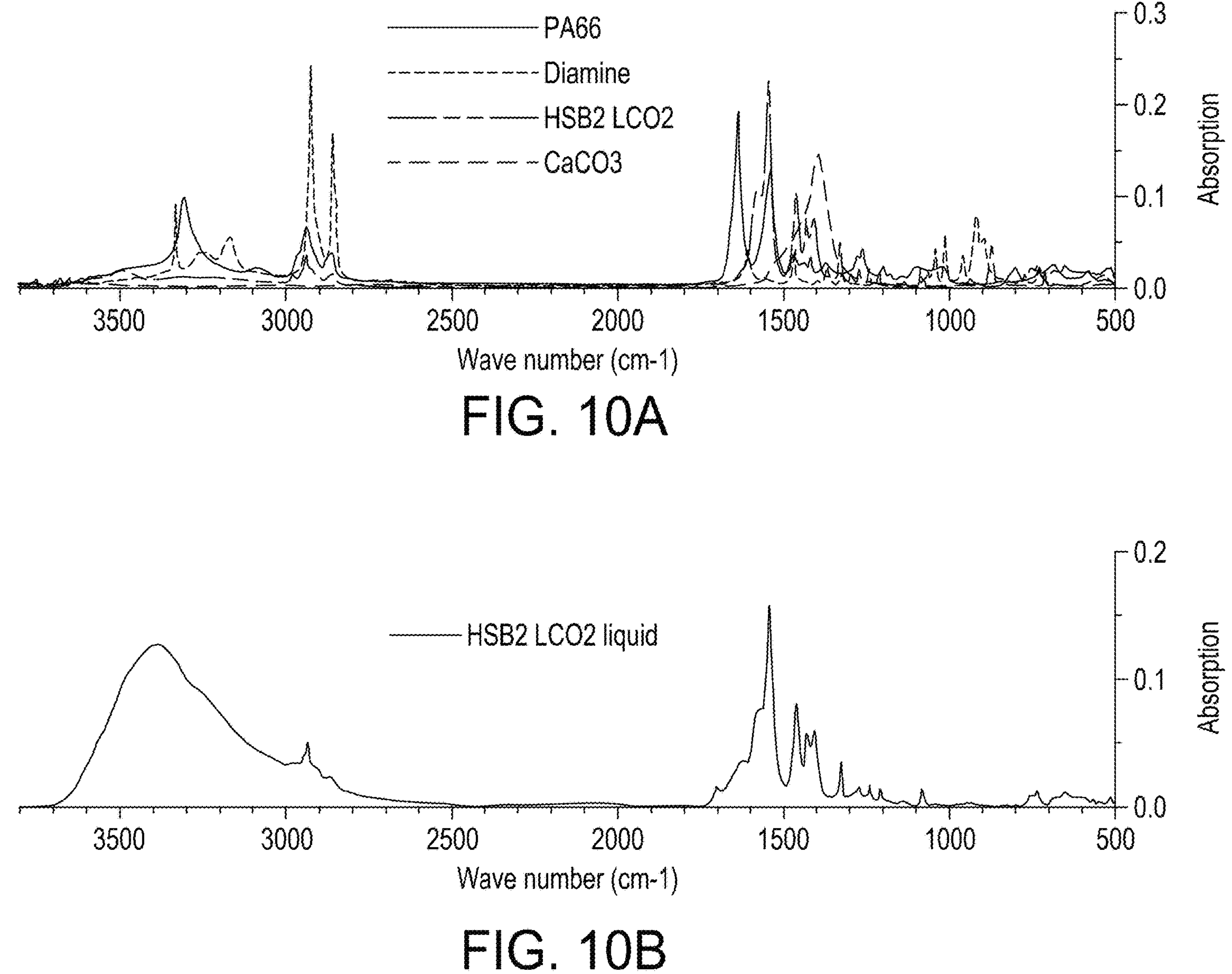
FIG. 10A provides an FTIR-ATR spectra of the solid precipitates according to Example 2, according to one or more aspects of the present disclosure.
FIG. 10B provides an FTIR-ATR spectra of the freeze-dried liquid according to Example 2, according to one or more aspects of the present disclosure.

Referring now to FIGS. 6A-6C, illustrated is a methodology and system for reinforcing (increasing the integrity) of caprock using precursor chemicals, according to one or more aspects of the present disclosure. Like numerical references will be used for like elements in FIGS. 6A-6C. As shown in each of FIGS. 6A-6C, a saline aquifer 602 is identified for $CO_2$ geosequestration. The saline aquifer 602 is located below the subsurface 604, and atop the saline aquifer 602 is a layer of caprock 606. An interface 608 exists between the caprock 606 and the saline aquifer 602. The caprock 606, as shown, comprises a number of potential leakage pathways, namely a fault 610 and fractures 612. It is to be appreciated that the caprock 606 may have one or more of only fault potential leakage pathways, may have one or more of only fracture potential leakage pathways, or may have a plurality of both fault and fracture potential leakage pathways, without departing from the scope of the present disclosure. An injection well 620 extends through the subsurface 604, through the caprock 606, and into (or through) the saline aquifer 602 for $CO_2$ geosequestration. The injection well 620 extends from a wellhead 630 (see FIG. 3 and associated elements) located at the surface 632.

As shown in FIG. 6A, the injection well 620 extends from a wellhead 630 and into a saline aquifer that is in use for $CO_2$ 642 geosequestration, comprising a CO2 plume 652 beneath the caprock 606. As shown, the caprock 606 comprises leakage pathways, namely fault 610 and fractures 612. Leakage 614 of $CO_2$ 642, as shown, is actively occurring. While leakage 614 is shown emanating from fault 610, leakage may additionally be emanating through fractures 612, or solely through fractures 612, without departing from the scope of the present disclosure.

As shown in FIG. 6B, precursor chemicals 640 (arrows) are injected through the injection well 620 and into the saline aquifer 602 at or near the interface 608 between the caprock 606 and the saline aquifer 602. Accordingly, the precursor chemicals 640 are deposited at or near the interface 608 between the caprock 606 and the saline aquifer 602, covering a large portion or all of the interface 608, and further penetrate upward through the caprock 606 into leakage pathway fault 610 and fractures 612, when present. The precursor chemicals 640 may further penetrate upward through intestinal spaces (due to porosity) (not shown) in mineral components of the caprock 606. Leakage 614 (see FIG. 6A) may continue to occur; however, the precursor chemicals 640 themselves may reduce or prevent leakage 614.

Referring now to FIG. 6C, after injection of the precursor chemicals 640 (FIG. 6B), the precursor chemicals 640 contact the geosequestered $CO_2$ 642 (see FIG. 6A) in the CO2 plumee 652, or newly injected $CO_2$ through the injection well 620 to the saline aquifer 602, at the interface 608 and within leakage pathway fault 610 and fractures 612. Reaction between the precursor chemicals 640 (FIG. 6B) and the $CO_2$ 642 in the CO2 plume 652 results in the formation of mineralization and/or gelation 650 of the precursor chemicals 640 (FIG. 6B). The mineralization and/or gelation 650 reinforces (increases the integrity of) the caprock 606, thereby preventing emission of the $CO_2$ 642 in the CO2 plume from leakage pathways, such as fault 610 and fractures 612, or any other porous portions of the caprock 606 (not shown). Accordingly, the $CO_2$ 642 in the CO2 plume 652 (and additional $CO_2$ injected through the injection well 620) can be effectively geosequestered beneath the caprock 606.

Accordingly, in one or more embodiments, the present disclosure provides a method comprising identifying an existing saline aquifer (or depleted oil and gas well) having caprock used for $CO_2$ geosequestration. The caprock comprises one or more leakage pathways that are actively leaking. The existing $CO_2$ geosequestration system includes an injection well penetrating through the caprock and into the saline aquifer.

A plurality of precursor chemicals is injected into the injection well (through the wellhead) to the saline aquifer and is deposited at or near the interface between the caprock and the saline aquifer. The precursor chemicals further penetrate upward through the caprock (upward past the interface) through any leakage pathways, such as faults and/or fractures. Thereafter, $CO_2$ existing in the saline aquifer (in a geosequestered CO2 plume) and/or newly injected $CO_2$ into the injection well that migrates upward to the interface contacts the precursor chemicals, including those within any leakage pathways comprising the precursor chemicals. The $CO_2$ reacts with the precursor chemicals, resulting in mineralization and/or gelation, thereby reinforcing the caprock.

Accordingly, the geosequestered $CO_2$ in the saline aquifer, and any newly injected $CO_2$ into the saline aquifer, is able to be effectively geosequestered beneath the reinforced caprock (e.g., a CO2 plume) without leakage.

Accordingly, the present disclosure provides for various precursor chemicals for use in mineralization and/or gelation upon reaction with $CO_2$ (and divalent ions) for reinforcing caprock in $CO_2$ geosequestration in saline aquifers or depleted oil and gas wells.

Nonlimiting Example Embodiments

Embodiments disclosed herein include:

Embodiment A. A method comprising: providing an injection well into which fluids are injected into a saline aquifer, the saline aquifer located below a caprock and an interface located between the saline aquifer and the caprock; injecting a plurality of precursor chemicals through the injection well and into the saline aquifer; depositing the precursor chemicals at or near the interface; injecting $CO_2$ through the injection well and into the saline aquifer; contacting the $CO_2$ with the precursor chemicals; and reacting the $CO_2$ and the precursor chemicals to reinforce the caprock by one or both of mineralization or gelation, thereby forming reinforced caprock.

Embodiment B. A method comprising: providing an injection well into which fluids are injected into a saline aquifer having a geosequestered CO2 plume therein, the saline aquifer located below a caprock and an interface located between the saline aquifer and the caprock, and wherein the caprock comprises at least one leakage pathway; injecting a plurality of precursor chemicals through the injection well and into the saline aquifer; depositing the precursor chemicals at or near the interface; contacting the precursor chemicals with the geosequestered $CO_2$; and reacting the $CO_2$ and the precursor chemicals to reinforce the caprock by one or both of mineralization or gelation, thereby forming reinforced caprock and preventing leakage of $CO_2$ from the geosequestered CO2 plume through the at least one leakage pathway.

Embodiment C. A system comprising: an injection well for accessing a saline aquifer; a reinforced caprock located above the saline aquifer, wherein the reinforced caprock is comprised of one or both of mineralization or gelation by a reaction between a plurality of precursor chemicals and $CO_2$; and a geosequestered CO2 plume in the saline aquifer beneath the reinforced caprock.

Each of embodiments A through C may have one or more of the following additional elements:

Element 1: wherein the plurality of precursor chemicals comprises bifunctional molecules comprising a first functional group for binding to a mineral surface of the caprock and a second functional group for reacting with the $CO_2$.

Element 2: wherein the plurality of precursor chemicals comprises bifunctional molecules comprising an alkoxysilane functional group for binding to a mineral surface of the caprock and an organofunctional group for reacting with the $CO_2$, the organofunctional group comprising an amine or an acid.

Element 3: wherein the plurality of precursor chemicals is selected from the group consisting of bis(3-(trimethoxysilyl) propyl)amine; 3-aminopropyltriethoxysilane; N-[3-(trimethoxysilyl)propyl]ethylenediamine; N-[3-(triethoxysilyl)propyl]diethylenetriamine; N-(trimethoxysilylpropyl) ethylenediaminetriacetate; 3-(1,3-dimethylbutylidene) aminopropyltriethoxysilane; n-(2-aminomethyl)-2,2,4-trimethyl-1-aza-2-silacyclopentane; n-(2-aminoethyl)-2,2,4-trimethyl-1-aza-2-silacyclopentane; 1-ethyl-2,2-dimethoxy-4-methyl-1-aza-2-silacyclopentane; 1,6-hexanediamine; and any combination thereof.

Element 4: wherein the plurality of precursor chemicals comprises 1,6-hexanediamine.

Element 5: wherein the plurality of precursor chemicals comprises adipic acid.

Element 6: wherein the plurality of precursor chemicals is a waste plastic selected from the group consisting of a polyamide, a polyaramid, a polyimide, and any combination thereof.

Element 7: wherein the saline aquifer is an aqueous environment comprising divalent ions, the divalent ions including at least one or both of $Mg^{2+}$ or $Ca^{2+}$.

Element 8: further comprising geosequestering a CO2 plume beneath the reinforced caprock.

Element 9: wherein the caprock comprises at least one leakage pathway, and further comprising geosequestering a CO2 plume beneath the reinforced caprock and preventing leakage of $CO_2$ from the geosequestered CO2 plume through the at least one leakage pathway.

Element 10: wherein the caprock comprises at least one leakage pathway selected from the group consisting of a fault, a fracture, and any combination thereof, and further comprising geosequestering a CO2 plume beneath the reinforced caprock and preventing leakage of $CO_2$ from the geosequestered CO2 plume through the at least one leakage pathway.

Each of Embodiments A and B may have any one, more, or all of Elements 1-10 in any combination, without limitation.

Embodiment C may have any one, more, or all of Elements 1-7 in any combination, without limitation.

EXAMPLES

In the following examples, various experiments were performed and measurements taken to evaluate and validate the use of the precursor chemicals of the present disclosure for caprock integrity enhancement for $CO_2$ geosequestration applications.

EXAMPLE 1: In this Example, the Precursor Chemical of 1,6-Hexanediamine (diamine) was evaluated for use in $CO_2$ geosequestration applications.

The precursor chemical, 1,6-hexanediamine (diamine) (Sigma Aldrich (St. Louis, MO)), was dissolved in deionized water to make a 50% water solution (diamine solution). 0.5 milliliters (mL) of the diamine solution was added to a vial, and then 5 mL of a brine solution was added to the vial. The brine solution comprised dissolved $CaCl_2$ and $MgCl_2$ in deionized water. Thereafter, 10 grams (g) of dry ice (solid $CO_2$) was added to the vial; the vial was immediately sealed inside a pressure vessel.

The concentration of each component in the vial is provided in Table 1 below.

TABLE 1

| Component | Amount in Vial |
|---|---|
| 1,6-hexanediamine, 50% in water | 0.5 mL |
| Brine | 5 mL |
| $Ca^{2+}$ | 0.34 molar concentration (M) |
| $Mg^{2+}$ | 0.06M |
| Dry Ice ($CO_2$) | 10 g |

The pressure in the pressure vessel was kept at <3000 psi and was placed in an oven at a temperature of 150° C. for three days. The temperature was then allowed to cool to room temperature, and the pressure in the pressure vessel was allowed to release. Thereafter, the vial was removed from the pressure vessel, and mineralization was observed in the form of solid, white precipitates at the bottom of the vial with a liquid supernatant above the solid precipitates; the a photograph of the vial is shown in FIG. 7.

The solid precipitates were filtered from the vial (and supernatant) and dried. Thereafter, the filtered and dried solid particulates were tested using Fourier-transform infrared (FTIR) spectroscopy on a NICOLET™ iS50 FTIR Spectrometer (Thermo Fisher Scientific, Massachusetts, USA). The spectrometer was used with an ATR iD7/iTX GE crystal and a DTGS KBr detector. The FTIR-ATR spectra collected for solid polymer samples employed 64 scans and a 2 $cm^{-1}$ resolution over a 4000-600 $cm^{-1}$ range.

The FTIR spectra are shown in FIG. 8, indicating that the white particulates were composed of calcium carbonate, showing a broadband peak at about 1390 $cm^{-1}$ and sharp peaks at about 871 $cm^{-1}$ and 712 $cm^{-1}$.

Example 2: In this Example, the Precursor Chemical of Waste Plastic of PA66 (polyamide) was evaluated for use in $CO_2$ geosequestration applications.

The precursor chemical, 0.5 g of PA66 pellets (Chemco Specialists, Inc., North Carolina) were placed in a vial. To the vial, 5 mL of a high-salinity brine (HS brine 2 or HSB2) that contained NaCl, $CaCl_2$, $MgCl_2$, and $NaHCO_3$ was added, and the pH of the contents of the vial was adjusted to below 4 using 6M HCl. The vial was placed inside a pressure vessel, and about 15 g of dry ice (solid $CO_2$) was added to the pressure vessel. The pressure vessel was sealed immediately after $CO_2$ addition.

The concentration of each component in the vial and pressure vessel is provided in Table 2 below.

TABLE 2

| Component | Amount in Vial/Pressure Vessel |
|---|---|
| PA66 | 0.5 g |
| Brine | 5 mL |
| 6M HCl | 0.82 mL |
| $Ca^{2+}$ | 0.64M |
| $Mg^{2+}$ | 0.15M |
| Dry Ice ($CO_2$) | 15 g |

After several hours, it was expected that all $CO_2$ should have partially dissolved in the brine and partially vaporized, and the $CO_2$ in the gas phase versus the dissolved $CO_2$ in the liquid phase should have reached equilibrium. Next, the pressure vessel was placed inside an oven at 150° C. for four days. Then, the temperature was allowed to cool to room temperature, and the pressure in the pressure vessel was allowed to release. Thereafter, the vial was removed from the pressure vessel, and all of the waste plastic precursor chemicals had dissolved (disappeared). The brine phase was initially clear and then solid precipitates began to appear as the vial cooled, while small bubbles of $CO_2$ arose from the liquid phase. A sodium hydroxide (NaOH) solution was added to adjust the pH to be between about pH 5 and pH 6. $CO_2$ (in the form of dry ice) was added into the vial inside the pressure vessels. After keeping the pressure vessel at 70° C. for 24 hours, the samples were cooled to room temperature. Precipitates were formed (HSB2 $CO_2$ Solid). A photograph of the vial comprising the solid particulates is shown in FIG. 9.

Figure 11:
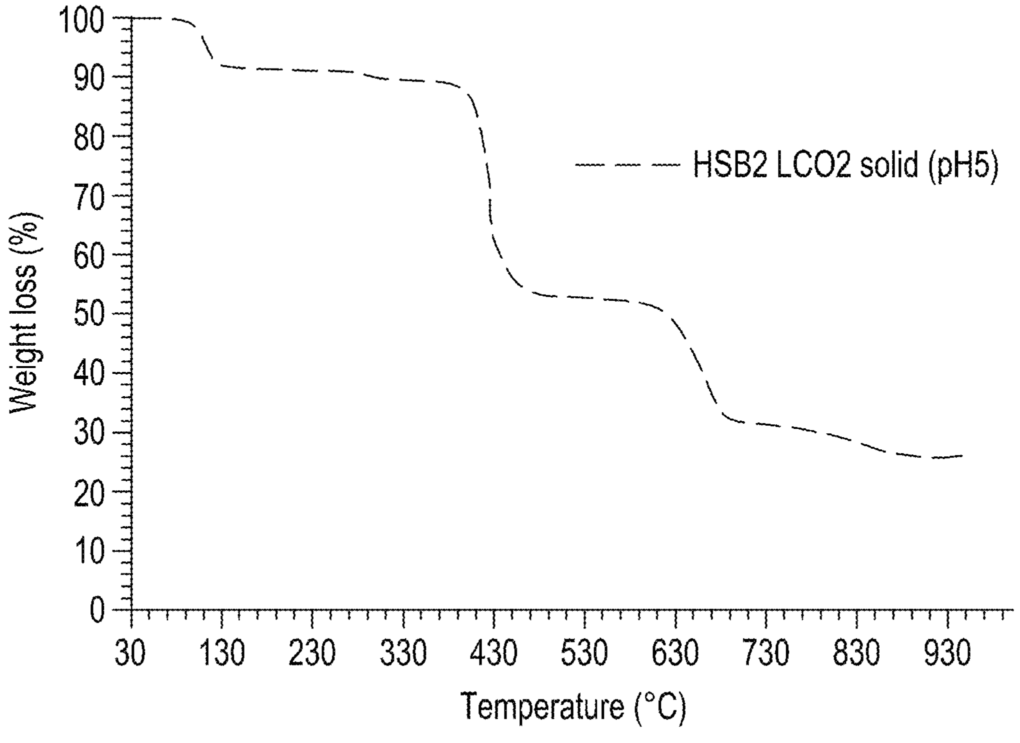
FIG. 11 provides a TGA plot of the solid precipitates according to Example 2, according to one or more aspects of the present disclosure.

The solid precipitates were filtered from the vial and dried. Thereafter, the filtered and dried solid particulates (HSB2 $LCO_2$ Solid) were tested using FTIR-attenuated total reflection (ATR) per and compared to $CaCO_3$, PA66, and hexamethylenediamine (diamine). Adipate was evaluated because it was expected that the reaction of PA66 would hydrolyze and form adipic acid that reacts with divalent ions to for an inorganic polymer (see FIG. 2B). The FTIR spectra results are shown in FIG. 11. The FTIR spectra of FIG. 11 demonstrate the presence of poly(calcium adipate).

The HSB2 $LCO_2$ Solid were also tested using thermographic analysis (TGA). TGA measurements were performed on a TA Instrument Discovery TGA in the range of 30° C.-900° C. at a constant ramp rate of 10° C. $min^{-1}$ under a $N_2$ atmosphere. The results are shown in FIG. 11. As shown, the first weight loss at onset of 99.5° C. is the loss of water from poly(calcium adipate); the second weight loss at an onset of 410.4° C. is a loss of —CO to form calcium oxalate; the third weight loss at 627.5° C. is the loss of $CO_2$ to form $CaCO_3$.

Figure 12A:
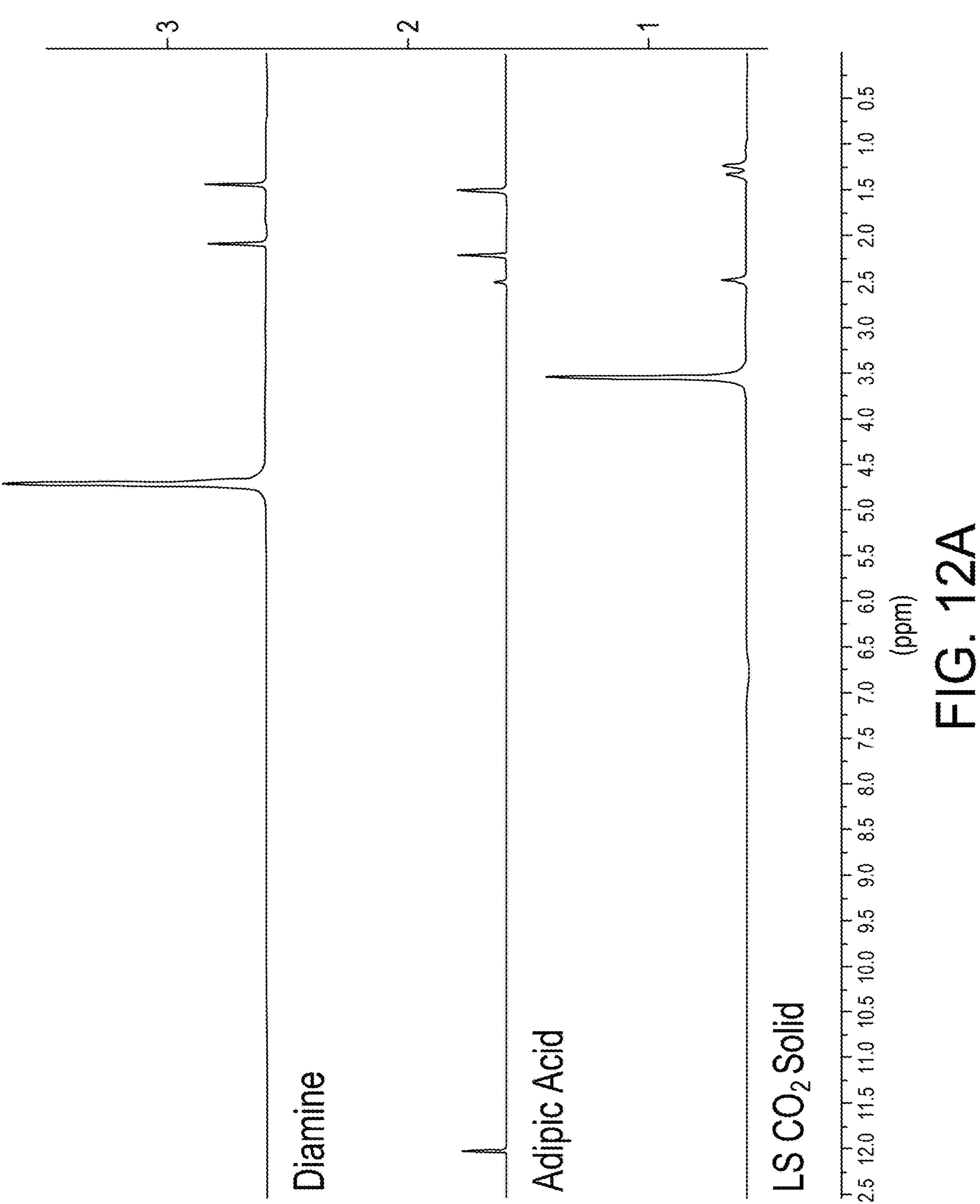
FIG. 12A provides $^1H$ NMR (in $D_2O$) spectra of the solid precipitates according to Example 2, according to one or more aspects of the present disclosure.
Figure 12B:
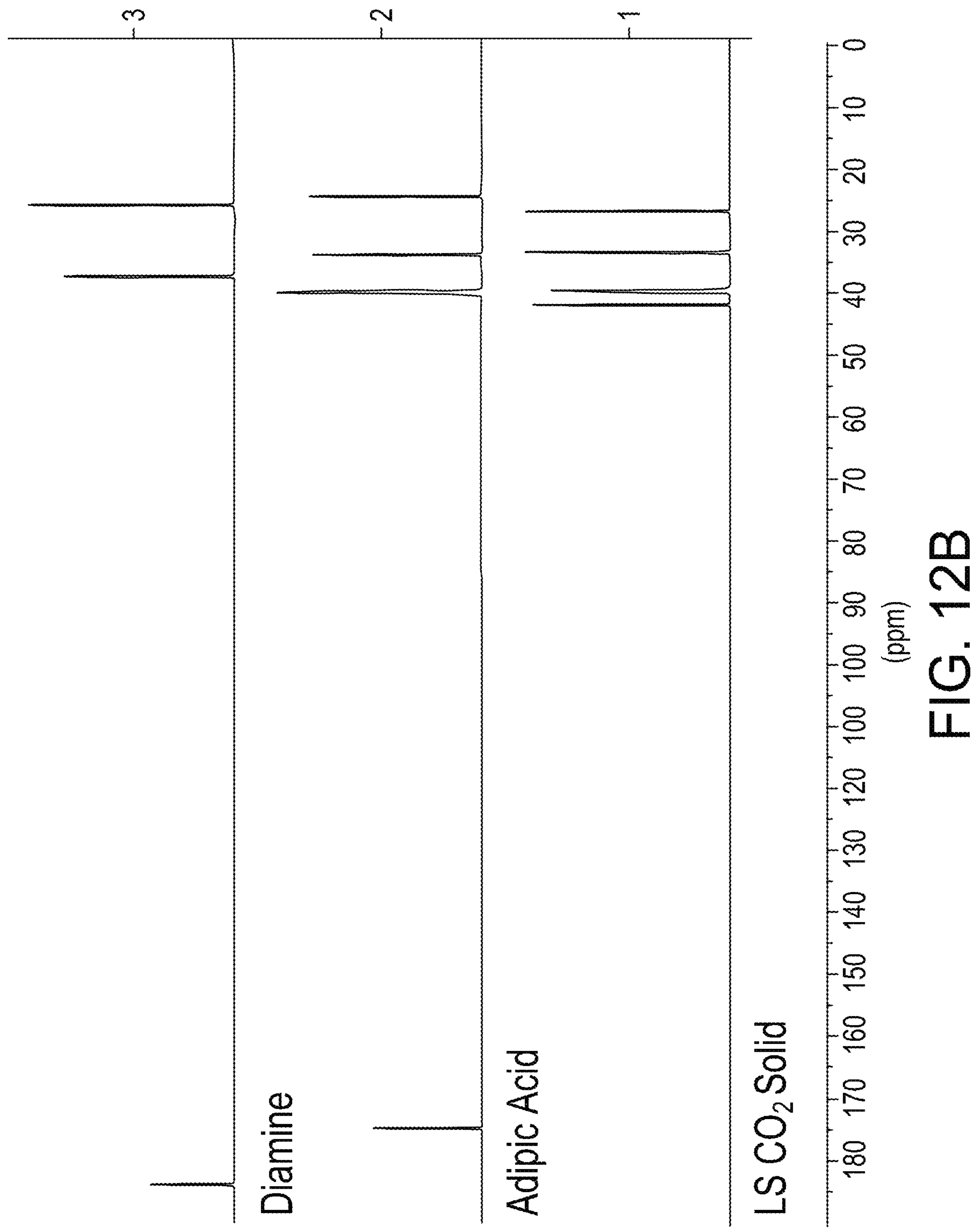
FIG. 12B provides $^{13}C$ NMR (in $D_2O$) spectra of the solid precipitates according to Example 2, according to one or more aspects of the present disclosure.

The HSB2 $LCO_2$ Solid sample was further compared to diamine and adipic acid using $^1H$ and $^{13}C$ nuclear magnetic resonance (NMR) (in DMSO-$d_6$) spectra of various samples as shown in FIGS. 12A and 12B, respectively. Both of FIGS. 12A and 12B further confirm that the formation of poly (calcium adipate) as illustrated by shift of —COO— $^{13}C$ NMR peak to 185 ppm in the $^{13}C$ NMR spectra of HSB2 $LCO_2$ Solid comparing to the 175 ppm of the —COOH $^{13}C$ peak for adipic acid.

Accordingly, the present disclosure provides for various precursor chemicals for use in mineralization and/or gelation upon reaction with $CO_2$ (and divalent ions) for reinforcing caprock in $CO_2$ geosequestration in saline aquifers or depleted oil and gas wells.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized that these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and are not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component or composition not expressly recited or disclosed herein. Any method may lack any step not recited or disclosed herein. Likewise, the term "comprising" is considered synonymous with the term "including." Whenever a method, composition, element, or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A method comprising:

providing an injection well into which fluids are injected into a saline aquifer, the saline aquifer located below a caprock and an interface located between the saline aquifer and the caprock;

injecting a plurality of precursor chemicals comprising bifunctional molecules comprising a first functional group for binding to a mineral surface of the caprock and a second functional group for reacting with the $CO_2$ through the injection well and into the saline aquifer;

depositing the precursor chemicals at or near the interface;

injecting $CO_2$ through the injection well and into the saline aquifer;

contacting the $CO_2$ with the precursor chemicals; and reacting the $CO_2$ and the precursor chemicals to reinforce the caprock by one or both of mineralization or gelation, thereby forming reinforced caprock.

2. The method of claim 1, wherein the bifunctional molecules comprise an alkoxysilane functional group for binding to a mineral surface of the caprock and an organofunctional group for reacting with the $CO_2$, the organofunctional group comprising an amine or an acid.

3. The method of claim 1, wherein the plurality of precursor chemicals is selected from the group consisting of bis(3-(trimethoxysilyl)propyl)amine; 3-aminopropyltriethoxysilane; N-[3-(trimethoxysilyl)propyl]ethylenediamine; N-[3-(triethoxysilyl)propyl]diethylenetriamine; N-(trimethoxysilylpropyl)ethylenediaminetriacetate; 3-(1,3-dimethylbutylidene)aminopropyltriethoxysilane; n-(2-aminomethyl)-2,2,4-trimethyl-1-aza-2-silacyclopentane; n-(2-aminoethyl)-2,2,4-trimethyl-1-aza-2-silacyclopentane; 1-ethyl-2,2-dimethoxy-4-methyl-1-aza-2-silacyclopentane; 1,6-hexanediamine; and any combination thereof.

4. The method of claim 1, wherein the plurality of precursor chemicals comprises 1,6-hexanediamine, adipic acid, or both.

5. The method of claim 1, wherein the plurality of precursor chemicals is a waste plastic selected from the group consisting of a polyamide, a polyaramid, a polyimide, and any combination thereof.

6. The method of claim 1, wherein the saline aquifer is an aqueous environment comprising divalent ions, the divalent ions including at least one or both of $Mg^{2+}$ or $Ca^{2+}$.

7. The method of claim 1, further comprising geosequestering a $CO_2$ plume beneath the reinforced caprock.

8. The method of claim 1, wherein the caprock comprises at least one leakage pathway selected from the group consisting of a fault, a fracture, and any combination thereof, and further comprising geosequestering a $CO_2$ plume beneath the reinforced caprock and preventing leakage of $CO_2$ from the geosequestered $CO_2$ plume through the at least one leakage pathway.

9. A method comprising:

providing an injection well into which fluids are injected into a saline aquifer having a geosequestered $CO_2$ plume therein, the saline aquifer located below a caprock and an interface located between the saline aquifer and the caprock, and wherein the caprock comprises at least one leakage pathway;

injecting a plurality of precursor chemicals comprising bifunctional molecules comprising a first functional group for binding to a mineral surface of the caprock and a second functional group for reacting with the $CO_2$ through the injection well and into the saline aquifer;

depositing the precursor chemicals at or near the interface;

contacting the precursor chemicals with the geosequestered $CO_2$; and reacting the $CO_2$ and the precursor chemicals to reinforce the caprock by one or both of mineralization or gelation, thereby forming reinforced caprock and preventing leakage of $CO_2$ from the geosequestered $CO_2$ plume through the at least one leakage pathway.

10. The method of claim 9, wherein the bifunctional molecules comprise an alkoxysilane functional group for binding to a mineral surface of the caprock and an organofunctional group for reacting with the $CO_2$, the organofunctional group comprising an amine or an acid.

11. The method of claim 9, wherein the plurality of precursor chemicals is selected from the group consisting of bis(3-(trimethoxysilyl)propyl)amine; 3-aminopropyltriethoxysilane; N-[3-(trimethoxysilyl)propyl]ethylenediamine; N-[3-(triethoxysilyl)propyl]diethylenetriamine; N-(trimethoxysilylpropyl)ethylenediaminetriacetate; 3-(1,3-dimethylbutylidene)aminopropyltriethoxysilane; n-(2-aminomethyl)-2,2,4-trimethyl-1-aza-2-silacyclopentane; n-(2-aminoethyl)-2,2,4-trimethyl-1-aza-2-silacyclopentane; 1-ethyl-2,2-dimethoxy-4-methyl-1-aza-2-silacyclopentane; 1,6-hexanediamine; and any combination thereof.

12. The method of claim 9, wherein the plurality of precursor chemicals comprises 1,6-hexanediamine.

13. The method of claim 9, wherein the plurality of precursor chemicals comprises adipic acid.

14. The method of claim 9, wherein the plurality of precursor chemicals is a waste plastic selected from the group consisting of a polyamide, a polyaramid, a polyimide, and any combination thereof.

15. The method of claim 9, wherein the saline aquifer is an aqueous environment comprising divalent ions, the divalent ions including at least one or both of $Mg^{2+}$ or $Ca^{2+}$.

16. The method of claim 9, wherein the at least one leakage pathway is selected from the group consisting of a fault, a fracture, and any combination thereof.

17. A system comprising:

an injection well for accessing a saline aquifer into which fluids are injected into the saline aquifer, a reinforced caprock located above the saline aquifer and an interface located between the saline aquifer and the caprock, a geosequestered $CO_2$ plume in the saline aquifer beneath the reinforced caprock, wherein a plurality of precursor chemicals are injected through the injection well and into the saline aquifer, wherein the precursor chemicals are deposited at or near the interface, wherein the reinforced caprock is comprised of one or both of mineralization or gelation by a reaction between the $CO_2$ and the plurality of precursor chemicals produced when the $CO_2$ contacts the plurality of precursor chemicals, wherein the plurality of precursor chemicals comprises bifunctional molecules comprising a first functional group for binding to a mineral surface of the caprock and a second functional group for reacting with the $CO_2$.

* * * * *